United States Patent
Heubel et al.

(10) Patent No.: US 9,558,637 B2
(45) Date of Patent: Jan. 31, 2017

(54) SYSTEMS AND METHODS FOR PERFORMING HAPTIC CONVERSION

(71) Applicant: Immersion Corporation, San Jose, CA (US)

(72) Inventors: Robert W Heubel, San Leandro, CA (US); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 41 days.

(21) Appl. No.: 14/022,694

(22) Filed: Sep. 10, 2013

(65) Prior Publication Data

US 2015/0072789 A1    Mar. 12, 2015

(51) Int. Cl.
| | |
|---|---|
| *G08B 6/00* | (2006.01) |
| *G06F 3/01* | (2006.01) |
| *A63F 13/24* | (2014.01) |
| *A63F 13/285* | (2014.01) |
| *A63F 13/28* | (2014.01) |

(52) U.S. Cl.
CPC .............. *G08B 6/00* (2013.01); *A63F 13/24* (2014.09); *A63F 13/28* (2014.09); *A63F 13/285* (2014.09); *G06F 3/016* (2013.01); *A63F 2300/1037* (2013.01)

(58) Field of Classification Search
CPC .......... G06F 3/041; G06F 3/017; G06F 3/016; G06F 3/0484; G06F 3/0488
See application file for complete search history.

(56) References Cited

U.S. PATENT DOCUMENTS

| | | | |
|---|---|---|---|
| 2011/0043454 A1* | 2/2011 | Modarres | B06B 1/0629 345/173 |
| 2011/0248817 A1* | 10/2011 | Houston et al. | 340/4.2 |
| 2011/0309918 A1 | 12/2011 | Ramsay | |
| 2012/0068835 A1* | 3/2012 | Li | G06F 3/016 340/407.2 |
| 2012/0188180 A1* | 7/2012 | Yang et al. | 345/173 |
| 2013/0050128 A1 | 2/2013 | Bae et al. | |
| 2013/0234972 A1* | 9/2013 | Bogsanyi | 345/173 |
| 2014/0229870 A1* | 8/2014 | Haghanegi | 715/764 |

FOREIGN PATENT DOCUMENTS

| | | |
|---|---|---|
| CN | 104423595 | 3/2015 |
| EP | 940162 | 9/1999 |
| EP | 2179799 | 4/2010 |
| JP | 2015056183 | 3/2015 |

OTHER PUBLICATIONS

European Patent Office, European Application No. EP14184000.9, Extended European Search Report, dated Feb. 9, 2015, 11 pages.

* cited by examiner

*Primary Examiner* — Dwayne Bost
*Assistant Examiner* — Robert Michaud
(74) *Attorney, Agent, or Firm* — Kilpatrick Townsend & Stockton, LLP (57) ABSTRACT

Systems and methods for haptic conversion are described. One disclosed method includes the steps of: determining a characteristic of a target user interface device having a target haptic output device, determining a source haptic effect associated with a source user interface device having a source haptic output device; converting the source haptic effect to a target haptic effect, the conversion based at least in part on the characteristic of the target haptic output device, and generating a haptic signal associated with the target haptic effect, the haptic signal configured to cause the target haptic output device to output the target haptic effect.

25 Claims, 5 Drawing Sheets

SYSTEMS AND METHODS FOR PERFORMING HAPTIC CONVERSION

FIELD OF THE INVENTION

The present invention generally relates to haptic feedback and more particularly to systems and methods for performing haptic conversion.

BACKGROUND

Touch enabled devices have become increasingly popular. For instance, mobile and other devices may be configured with touch-sensitive displays so that a user can provide input by touching portions of the touch-sensitive display. And the touch-sensitive device may make use of haptic effects, for example, haptic effects configured to augment a visual or auditory effect. This type of haptic effect can be used to provide information to the user. However, at times the effect may be designed for a particular type of device but be output by a different type of device. Performing a haptic conversion in such a case may enable the device to provide haptic information that would otherwise be lost to a user.

SUMMARY

Embodiments of the present disclosure include devices configured to output haptic effects and further configured to perform a haptic conversion. These haptic effects may include, but are not limited to, vibrations, changes in texture, changes in coefficient of friction, and/or simulation of boundaries, obstacles, or other discontinuities that can be perceived through use of an interface device. Some software applications may be designed to output haptic effects in specialized devices, e.g., to specific types of actuators. Since not all devices comprise the same type of actuators, systems for haptic conversion may increase the compatibility of software with a broader range of devices. Devices that comprise haptic conversion may be more user friendly and may provide a more compelling user experience.

In one embodiment, a method for haptic conversion comprises: determining a characteristic of a target user interface device having a target haptic output device, determining a source haptic effect associated with a source user interface device having a source haptic output device, converting the source haptic effect to a target haptic effect, the conversion based at least in part on the characteristic of the target haptic output device, and generating a haptic signal associated with the target haptic effect, the haptic signal configured to cause the target haptic output device to output the target haptic effect.

This illustrative embodiment is mentioned not to define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Example embodiments are described herein in the context of systems and methods for haptic conversion. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Haptic Conversion

In one embodiment, a mobile phone includes a haptic output device or actuator, such as an eccentric rotating mass motor. The phone's user wishes to play a video game on her phone, and so she executes the game.

Many such games are designed for game consoles. A game console typically includes one or more controllers that include multiple haptic actuators for providing haptic effects. For example, an actuator may include two motors for outputting dual vibration effects. In the illustrative embodiment, software on the mobile phone acts as a conversion layer for the haptic effects output by the game. While the conversion software in the illustrative embodiment is present in the phone, the conversion software may be contained in other components, such as a peripheral in communication with the phone. For example, the peripheral may be a wearable device, such as Google glass.

The conversion layer receives the haptic effect signal generated by the game. The conversion layer then determines the haptic capabilities of the mobile phone or of any peripherals in communication with the mobile phone. For example, the mobile phone described above in the illustrative embodiment includes a single ERM (eccentric rotating mass) for outputting vibration effects. The conversion layer uses information about the haptic output device in the mobile phone to determine how to render the haptic effect. For instance, it may determine how to represent the two-motor effect generated by the game using the single ERM present in the phone.

Once the conversion layer has determined how to represent the effect on the phone, the conversion layer generates a haptic signal to be sent to the ERM in the mobile phone and then communicates the signal to the ERM. The ERM then outputs the effect to the user of the mobile phone, enhancing play of the game on the mobile phone.

This illustrative example is given to introduce the reader to the general subject matter discussed herein. The invention is not limited to this example. The following sections describe various additional non-limiting embodiments and examples of devices, systems, and methods for parameter modification of haptic effects.

Illustrative Device for Implementing Haptic Conversion

Figure 1:
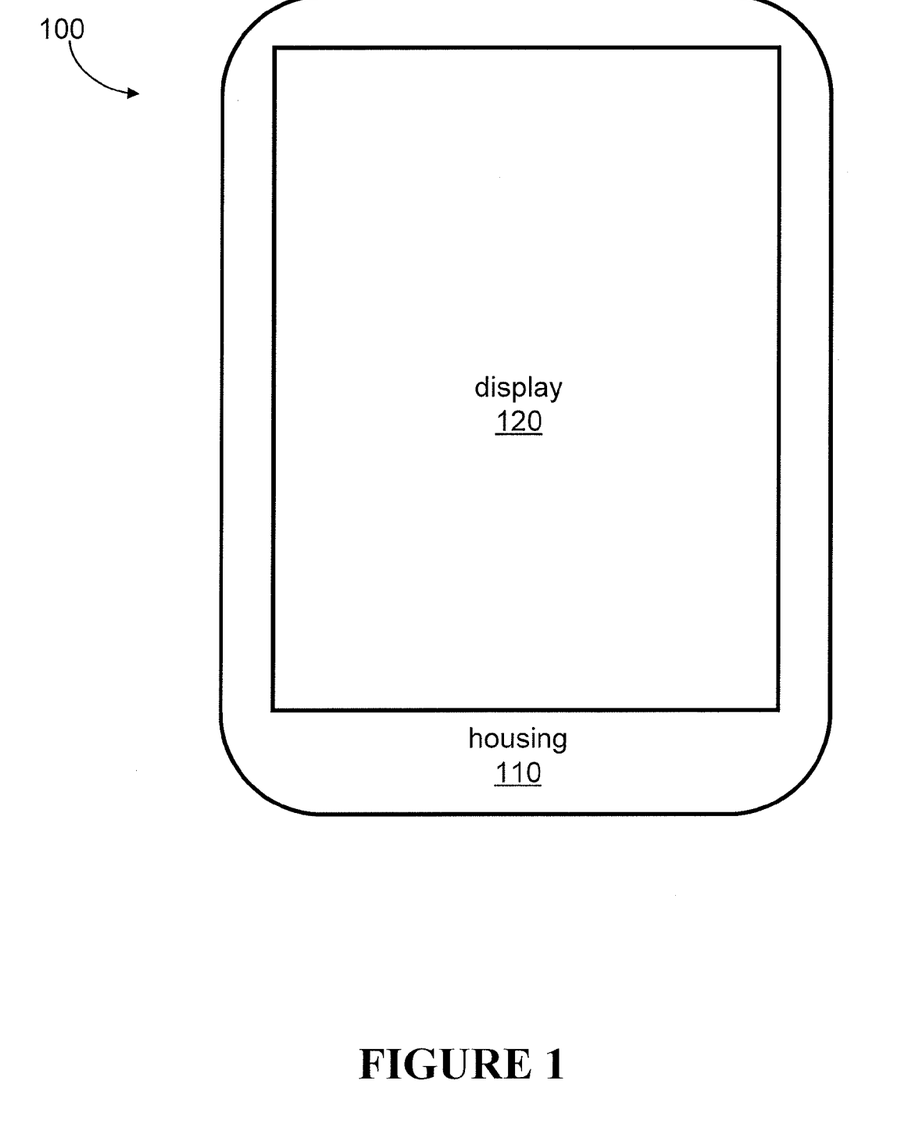
FIG. 1 illustrates one exemplary system for outputting haptic effects in one embodiment of the present disclosure.

FIG. 1 illustrates one exemplary system for outputting haptic effects in one embodiment of the present disclosure. The system shown in FIG. 1 is an electronic device 100 for haptic conversion. In the embodiment shown, electronic device 100 is a portable handheld phone, such as a smartphone. The smartphone 100 includes electronic circuitry for executing applications and allowing a user to interact with the smartphone 100.

The smartphone 100 includes a housing 110. The housing 110 contains electronic components, such as a processor and memory for executing programming code and for interacting with a user. The program code stored and executed on the phone may be used to implements methods of various embodiments of the present disclosure.

The smartphone 110 also includes a display 120. The display 120 may be a touch-sensitive display capable of detecting user interactions with the smartphone 100. As a user interacts with the smartphone 100, the smartphone 100 may output effects to alert the user to various interactions. For example, in one embodiment, the smartphone executes a gaming application that allows a user to play a game displayed on the display 120 of smartphone 100. As various actions take place in the game, the game may generate haptic effects that are appropriate for the various events occurring in the game, and the smartphone 100 may output effects that are generated based on the effects output by the game.

Figure 2:
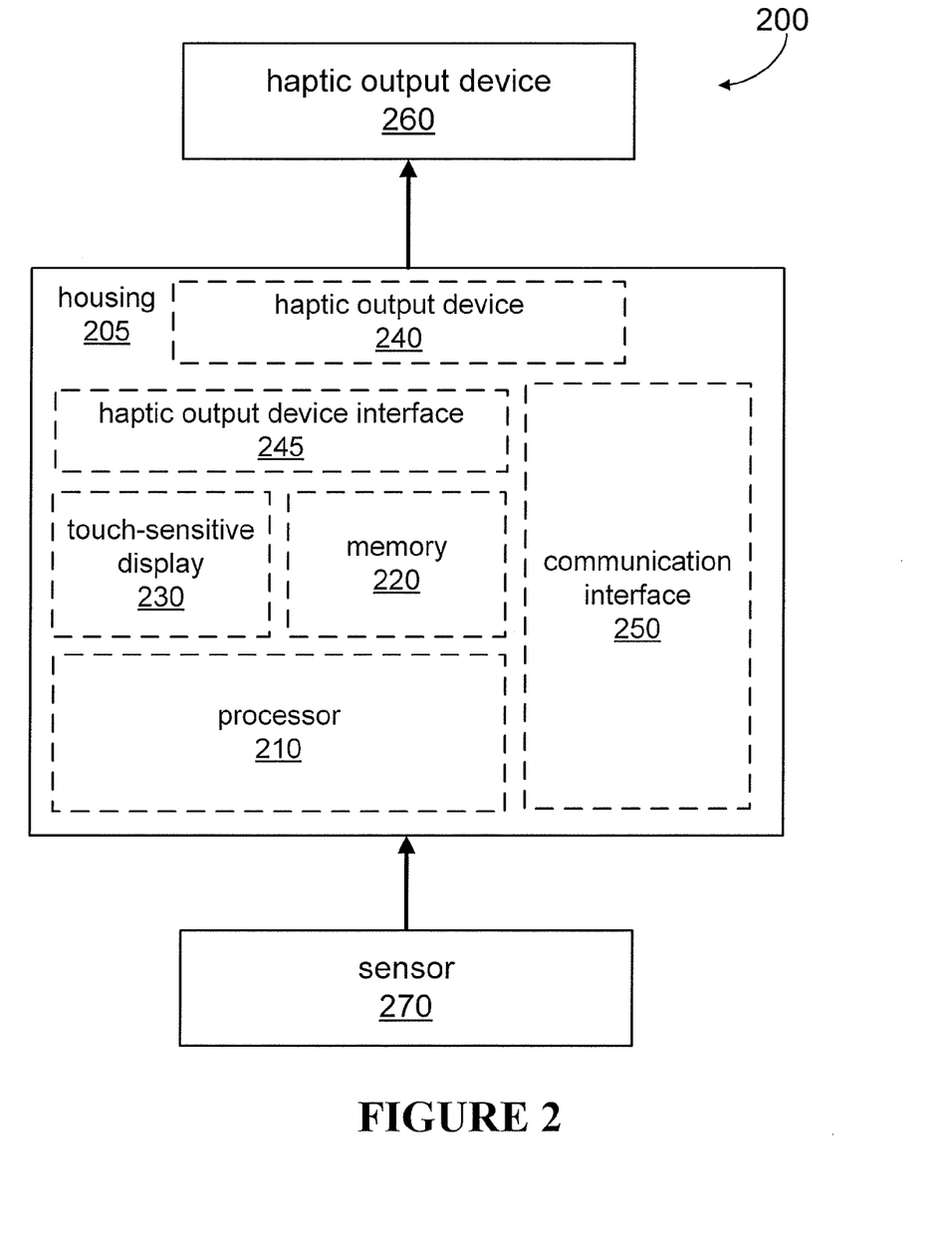
FIG. 2 is a block diagram showing an illustrative system for implementation of one embodiment of the present disclosure.

FIG. 2 is a block diagram showing an illustrative system for implementation of one embodiment of the present disclosure. Specifically, FIG. 2 illustrates an electronic device 200 for haptic conversion according to one embodiment. In the embodiment shown in FIG. 2, the electronic device 200 comprises a housing 205, a processor 210, a memory 220, a touch-sensitive display 230, a haptic output device 240, a communication interface 250, and a sensor 270. In addition, the electronic device 200 is in communication with haptic output device 260, which may optionally be coupled to or incorporated into some embodiments.

The electronic device 200 can be any device that is capable of receiving user input e.g., a mobile phone, a tablet, a music player, a wearable device, or a laptop computer. In another embodiment, electronic device 200 may comprise a multifunction controller. For example, a controller for use in a kiosk, ATM, or other computing device. Further, in one embodiment, electronic device 200 may comprise a controller for use in a vehicle.

The processor 210 is in communication with the memory 220, and, in the embodiment shown, both the processor 210 and the memory 220 are disposed within the housing 205. The touch-sensitive display 230, which comprises or is in communication with a touch-sensitive surface, is partially disposed within the housing 205 such that at least a portion of the touch-sensitive display 230 is exposed to a user of the electronic device 200. In some embodiments, the touch-sensitive display 230 may not be disposed within the housing 205. For example, the electronic device 200 may be connected to or otherwise communicate with a touch-sensitive display 230 disposed within a separate housing. In some embodiments, the housing 205 may comprise two housings that are slidably coupled to each other, pivotably coupled to each other, or releasably coupled to each other. In other embodiments, the housing 205 may comprise any number of housings.

In the embodiment shown in FIG. 2, the touch-sensitive display 230 is in communication with the processor 210 and is configured to provide signals to the processor 210 and/or the memory 220 and to receive signals from the processor 210 and/or memory 220.

The processor 210 may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices The memory 220 can comprise any suitable tangible (and non-transitory) computer-readable medium such as RAM, ROM, EEPROM, or the like, that embodies program components that configure operation of the computing device. In some embodiments, memory 220 is configured to store program code or data, or both, for use by the processor 210, which is configured to execute program code stored in memory 220 and to transmit signals to and receive signals from the touch-sensitive display 230. In the embodiment shown in FIG. 2, the processor 210 is in communication with the communication interface 250 and is configured to receive signals from the communication interface 250 and to output signals to the communication interface 250 to communicate with other components or devices such as one or more electronic devices. In addition, the processor 210 is in communication with haptic output device 240 and haptic output device 260 and is further configured to output signals to cause haptic output device 240 or haptic output device 260, or both, to output one or more haptic effects.

Furthermore, the processor 210 is in communication with sensor 270 and is configured to receive signals from sensor 270. For example, processor 210 may receive one or more signals from sensor 270 corresponding with one or more interactions with the electronic device 200. For instance, one or more sensor signals may be received by processor 210 from sensor 270 when a user of the electronic device 200 moves or shakes the device 200, such as when playing a video game. As another example, one or more sensor signals can be received by processor 210 from sensor 270 when a user presses a location on the touch-sensitive display 230 and/or when a user makes a gesture on touch-sensitive display 230. In some embodiments, processor 210 can receive sensor information from one or more sensors, such as sensor 270, to derive or otherwise determine one or more interactions. Interactions can include, but are not limited to, a contact, a series of contacts, a gesture, a contact above a predetermined threshold, a contact below a predetermined threshold, a movement of the device, a vibration, a shake, any other suitable interaction, or a combination thereof.

In embodiments, processor 210 receives one or more sensor signals from one or more input devices integrated into the electronic device 200, connected to the electronic device 200, and/or in communication with the electronic device 200. For example, the processor 210 may receive one or more sensor signals from a touch-sensitive surface of the touch-sensitive display 230. As another example, the processor 210 may receive one or more sensor signals from an input device such as a keyboard, a mouse, a touchpad, a trackball, a microphone, a touch-sensitive surface, a gaming peripheral, such as a Bluetooth-enabled game controller, a button, a trigger, and/or another suitable input device that is integrated into the electronic device 200, connected to the electronic device 200, and/or in communication with the electronic device 200. A sensor signal may comprise information such as one or more contacts, locations, pressures, gestures, key presses, and/or other information indicating how a user is interacting with one or more input devices. Numerous other embodiments are disclosed herein and variations are within the scope of this disclosure.

The processor 210 may then utilize the information it receives from one or more sensors, such as sensor 270, to determine one or more effects to output. For example, the first sensor signal may indicate an interaction with electronic device 200 and the processor 210 may use the information in the sensor signal to determine one or more effects that should be output. For example, the processor 210 may determine that one or more audio effects, one or more visual effects, and/or one or more haptic effects should be output based at least in part on information received from one or more sensor signals.

Once the processor 210 determines one or more effects to output, the processor 210 can generate one or more output signals. For example, in one embodiment, the processor may determine a haptic effect and generate a haptic signal to be output to haptic output device 240 and/or 260, which then output the haptic effect. In some embodiments, the haptic signal may be interpreted by the haptic output device interface 245, which in turn can transmit a haptic signal to the haptic output device 240 or haptic output device 260.

In some embodiments of the present disclosure, the haptic output device that would typically be present in the platform for which an application was designed, i.e., the source haptic output device, may not be available on the target interface device 200. For example, in one embodiment, the application may be designed to operate with a LRA (linear resonant actuator) but the target interface device 200 may instead comprise a piezoelectric actuator. In such an embodiment, the haptic signal may be converted from the source haptic effect to a target haptic effect before the signal is transmitted to the target haptic output device 240 or haptic output device 260 or both.

For example, in one embodiment, the haptic output device interface 245 may access a data store in memory 220 that contains characteristics of haptic output devices 240, 260. The haptic output device interface 245 can then use the characteristics to determine what types of effects haptic output devices 240, 260 are capable of generating and convert the haptic signal from the original source haptic effect to a target effect. In some embodiments, this target effect may comprise an effect that represents the source and at the same time is capable of being output by the target haptic output devices 240, 260. Further details regarding such conversions are provided below.

Various source haptic output devices and environments may be utilized, such as DualShock (Console, PC), DirectX, Android, IOS, touchsense, wheels, joysticks, steering wheels, and web browser. Also, various target devices, including single and multiple-actuator devices, and target environments may be used. For example, the following devices and environments may be utilized in various embodiments: single or multiple actuator devices, multiple devices (using a mobile phone and a mobile peripheral), standard haptic actuators (ERM, LRA), high definition actuators (Piezo, EAP, etc.), deformation actuators, friction based touch screens (electrostatic vibration), gaming chairs, and directional devices. In one embodiment in which multiple users are interacting, such as in a multiplayer game, one player may be utilizing one environment, such as an iPhone, while a second player is utilizing a second environment, such as an Android OS phone.

The device illustrated in FIG. 2 is merely illustrative, and in various other embodiments, the electronic device 200 may comprise or be in communication with fewer or additional components and/or devices than shown in FIG. 2. For example, other user input devices such as a mouse, a keyboard, a camera and/or other input device(s) may be contained within the electronic device 200 or in communication with the electronic device 200. As another example, electronic device 200 may comprise or otherwise be in communication with one, two, three, or more sensors and/or one, two, three, or more haptic output devices. In another embodiment, electronic device 200 may not comprise a communication interface 250. In yet another embodiment, electronic device 200 may not be in communication with haptic output device 260. Numerous other embodiments are disclosed herein and variations are within the scope of this disclosure.

Various other components may also be modified. For example, in some embodiments, sensor 270 is partially or fully disposed within housing 205. As another example, haptic output device 260 may be disposed within the housing 205 of the electronic device 200. In one embodiment, the electronic device 200 is not in communication with haptic output device 260 and does not comprise communication interface 250. In another embodiment, the electronic device 200 does not comprise a touch-sensitive display 230 or a communication interface 250, but comprises a touch-sensitive surface (e.g., a touchpad) and is in communication with an external display. Thus, in various embodiments, the electronic device 200 may comprise or be in communication with any number of components, such as in the various embodiments disclosed herein as well as variations that would be apparent to one of skill in the art.

The electronic device 200 in FIG. 2 includes a touch-sensitive display 230 that comprises a touch-sensitive surface. In some embodiments, a touch-sensitive surface may be overlaid on the touch-sensitive display 230. In other embodiments, the electronic device 200 may comprise or be in communication with a display and a separate touch-sensitive surface. In still other embodiments, the electronic device 200 may comprise or be in communication with a display and may comprise or be in communication with other user input devices, such as a mouse, a keyboard, buttons, knobs, slider controls, switches, wheels, rollers, other manipulanda, or a combination thereof.

In some embodiments, one or more touch-sensitive surfaces may be included on or disposed within one or more sides of the electronic device 200. For example, in one embodiment, a touch-sensitive surface is disposed within or comprises a rear surface of the electronic device 200. In another embodiment, a first touch-sensitive surface is disposed within or comprises a rear surface of the electronic device 200 and a second touch-sensitive surface is disposed within or comprises a side surface of the electronic device 200.

In the embodiment shown in FIG. 2, the touch-sensitive display 230 provides a mechanism for a user to interact with the electronic device 200. For example, the touch-sensitive display 230 detects the location or pressure, or both, of a user's finger in response to a user hovering over, touching, or pressing the touch-sensitive display 230 (all of which may be referred to as a contact in this disclosure).

In one embodiment, a contact can occur through the use of a camera. For example, a camera may be used to track movements, such as the viewer's eye movements, as the reader views the content displayed on the display 230 of the electronic device 200. In this embodiment, haptic effects may be triggered based at least in part on the viewer's eye movements. For example, a haptic effect may be output when a determination is made that the viewer is viewing content at a particular location of the display 230. In some embodiments, the touch-sensitive display 230 may comprise, be coupled to, be connected with, or otherwise be in communication with one or more sensors that determine the location, pressure, a size of a contact patch, or any of these, of one or more contacts on the touch-sensitive display 230.

For example, in one embodiment, the touch-sensitive display 230 comprises or is in communication with a mutual capacitance system. In another embodiment, the touch-sensitive display 230 comprises or is in communication with an absolute capacitance system. In some embodiments, the touch-sensitive display 230 may comprise or be in communication with a resistive panel, a capacitive panel, infrared LEDs, photodetectors, image sensors, optical cameras, or a combination thereof. Thus, the touch-sensitive display 230 may incorporate any suitable technology to determine a contact on a touch-sensitive surface such as, for example, resistive, capacitive, infrared, optical, thermal, dispersive signal, or acoustic pulse technologies, or a combination thereof. In embodiments, a determined haptic effect is modified or otherwise configured based at least in part on interactions and/or other information received from one or more sensors that can be used to determine one or more interactions.

In the embodiment shown in FIG. 2, haptic output devices 240 and 260 are in communication with the processor 210 and are configured to provide one or more haptic effects. For example, in one embodiment, when a haptic signal is provided to haptic output device 240, haptic output device 260, or both, by the processor 210, the respective haptic output device(s) 240, 260 outputs a haptic effect based on the actuation signal. For example, in some embodiments the processor 210 is configured to transmit a haptic signal to haptic output device 240, the haptic signal comprising an analog drive signal. In some embodiments, the processor 210 is configured to transmit a command to haptic output device 260, wherein the command includes parameters to be used to generate an appropriate drive signal to cause the haptic output device 260 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal or from an analog to a digital signal using suitable processors or circuitry to accommodate the particular haptic output device being driven.

A haptic output device, such as haptic output devices 240 or 260, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices.

In still other embodiments, haptic output device 240 may apply electrostatic friction or attraction, for example by use of an electrostatic surface actuator, to simulate a texture on the surface of touch-sensitive display 230. Similarly, in some embodiments, haptic output device 240 may use electrostatic attraction to vary the friction the user feels on the surface of touch-sensitive display 230. For example, in one embodiment, haptic output device 240 may comprise an electrostatic display or any other device that applies voltages and currents instead of mechanical motion to generate a haptic effect.

In some embodiments, one or more haptic output devices are directly or indirectly in communication with electronic device 200, such as via wired or wireless communication. In one embodiment, the electronic device 200 can be placed in a vehicle or is integrated into a vehicle and one or more haptic output devices 240/260 are embedded into the vehicle. For example, one or more haptic output devices may be embedded in a seat, steering wheel, pedal, etc. of the vehicle. In some embodiments, instead of having haptic output device 240 and/or haptic output device 260 or in addition to having haptic output device 240 and/or haptic output device 260, the electronic device 200 has one or more other output devices. For example, the electronic device 200 may have a speaker and/or a display. In one embodiment, the electronic device 200 has one or more haptic output devices, one or more speakers, and one or more displays. Numerous other embodiments are disclosed herein and variations are within the scope of this disclosure.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass. In some such embodiments, the haptic effect may be configured to impart a vibration to the entire electronic device or to only one surface or a limited part of the electronic device. In another embodiment, friction between two or more components or friction between at least one component and at least one contact may be used to produce a haptic effect, such as by applying a brake to a moving component, such as to provide resistance to movement of a component or to provide a torque. In order to generate vibration effects, many devices utilize some type of actuator and/or other haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some embodiments, a haptic effect is a kinesthetic effect. U.S. patent application Ser. No. 13/092,484 describes ways that one or more haptic effects can be produced and describes various haptic output devices. The entirety of U.S. patent application Ser. No. 13/092,484, filed Apr. 22, 2011, is hereby incorporated by reference.

In FIG. 2, the communication interface 250 is in communication with the processor 210 and provides wired or wireless communications, from the electronic device 200 to other components or other devices. For example, the communication interface 250 may provide wireless communications between the electronic device 200 and a wireless sensor or a wireless actuation device. In some embodiments, the communication interface 250 may provide communications to one or more other devices, such as another electronic device 200, to allow users to interact with each other at their respective devices. The communication interface 250 can be any component or collection of components that enables the multi-pressure touch-sensitive input electronic device 200 to communicate with another component or device. For example, the communication interface 250 may comprise a PCI network adapter, a USB network adapter, or an Ethernet adapter. The communication interface 250 may communicate using wireless Ethernet, including 802.11a, g, b, or n standards. In one embodiment, the communication interface 250 can communicate using Radio Frequency (RF), Bluetooth, CDMA, TDMA, FDMA, GSM, WiFi, satellite, or other cellular or wireless technology. In other embodiments, the communication interface 250 may communicate through a wired connection and may be in communication with one or more networks, such as Ethernet, token ring, USB, FireWire 1394, fiber optic, etc. In some embodiments, electronic device 200 comprises a single communication interface 250. In other embodiments, electronic device 200 comprises two, three, four, or more communication interfaces. Thus, in embodiments, electronic device 200 can communicate with one or more components and/or devices through one or more communication interfaces. In other embodiments, an electronic device 200 may not comprise a communication interface 250.

The embodiment shown in FIG. 2 depicts a single sensor 270. In some embodiments, multiple sensors can be used. Additionally, a sensor may be housed in the same component as the other components of the electronic device 200 or in a separate component. For example, in some embodiments, the processor 210, memory 220, and sensor 270 are all comprised in an electronic device 200, such as a portable music player, a portable telephone, and/or a wearable device. In some embodiments, a sensor is placed in component separate from another component that houses the memory and/or processor. For instance, a wearable sensor may be in communication with the processor and memory or an electronic device via a wired or wireless connection.

In some embodiments, the electronic device 200 may comprise two or more housing components, such as in a clamshell arrangement or in a slidable arrangement. For example, in one embodiment electronic device 200 may comprise a clamshell configuration with a touch-sensitive display disposed in each of the portions of the clamshell. Furthermore, in embodiments where the electronic device 200 comprises at least one touch-sensitive surface on one or more sides of the electronic device 200 or in embodiments where the electronic device 200 is in communication with an external touch-sensitive surface, the display 230 may or may not comprise a touch-sensitive surface. In some embodiments, one or more touch-sensitive surfaces may have a flexible touch-sensitive surface. In other embodiments, one or more touch-sensitive surfaces may be rigid. In various embodiments, the electronic device 200 may comprise both flexible and rigid touch-sensitive surfaces.

The housing 205 of the electronic device 200 shown in FIG. 2 provides protection for at least some of the components of electronic device 200. For example, the housing 205 may be a plastic casing that protects the processor 210 and memory 220 from foreign articles such as rain, dirt, or dust. In some embodiments, the housing 205 protects the components in the housing 205 from damage if the electronic device 200 is dropped by a user. The housing 205 can be made of any suitable material including but not limited to plastics, rubbers, or metals. Various embodiments may comprise different types of housings or a plurality of housings. For example, in some embodiments, electronic device 200 may be a portable device, handheld device, toy, gaming console, handheld video game system, gamepad, game controller, desktop computer, portable multifunction device such as a cell phone, smartphone, personal digital assistant (PDA), eReader, portable reading device, handheld reading device, laptop, tablet computer, digital music player, remote control, medical instrument, etc. In embodiments, the electronic device 200 may be embedded in another device such as a vehicle, wrist watch, other jewelry, arm band, gloves, etc. Thus, in embodiments, the electronic device 200 is wearable. In some embodiments, the electronic device 200 may be embedded in another device such as, for example, the console of a car or a steering wheel. Numerous other embodiments are disclosed herein and variations are within the scope of this disclosure.

Illustrative System

Figure 3:
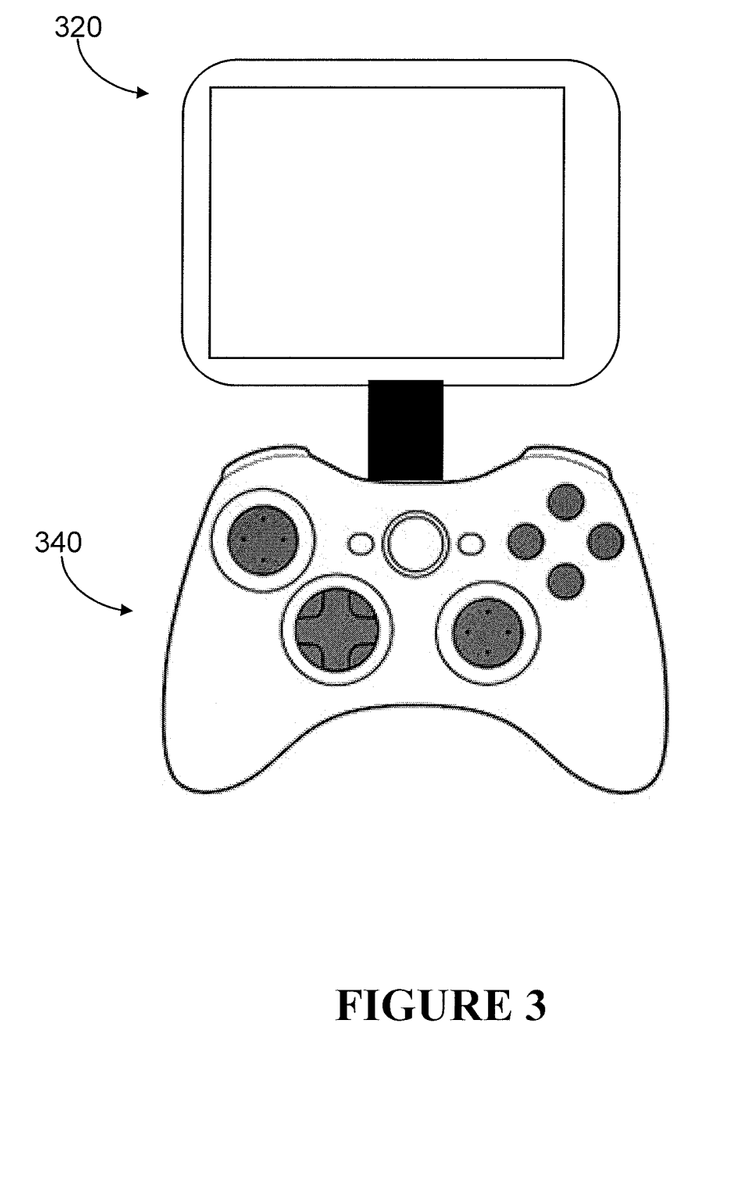
FIG. 3 illustrates another exemplary system for outputting haptic effects in one embodiment of the present disclosure.

FIG. 3 illustrates another exemplary system for outputting haptic effects according to one embodiment of the present disclosure. The embodiment shown in FIG. 3 comprises a mobile device 320, such as a mobile telephone (e.g., a smartphone). The mobile telephone 320 may include various components as shown illustrated in FIG. 2. The mobile phone 320 is in coupled to a mobile game controller 340 using a wired or wireless connection (e.g., wi-fi, Bluetooth, or other wireless connection known in the art).

The game controller 340 includes controls, such as buttons and joysticks for use in controlling a game or other software executing on the mobile telephone 320. In some embodiments, the game controller includes one or more haptic output devices, such as those shown in FIG. 2. In other embodiments, the haptic output device is contained within the mobile telephone 320, and effects are transmitted to the game controller 340 via the mobile telephone 320. Various other embodiments are also possible.

Figure 4:
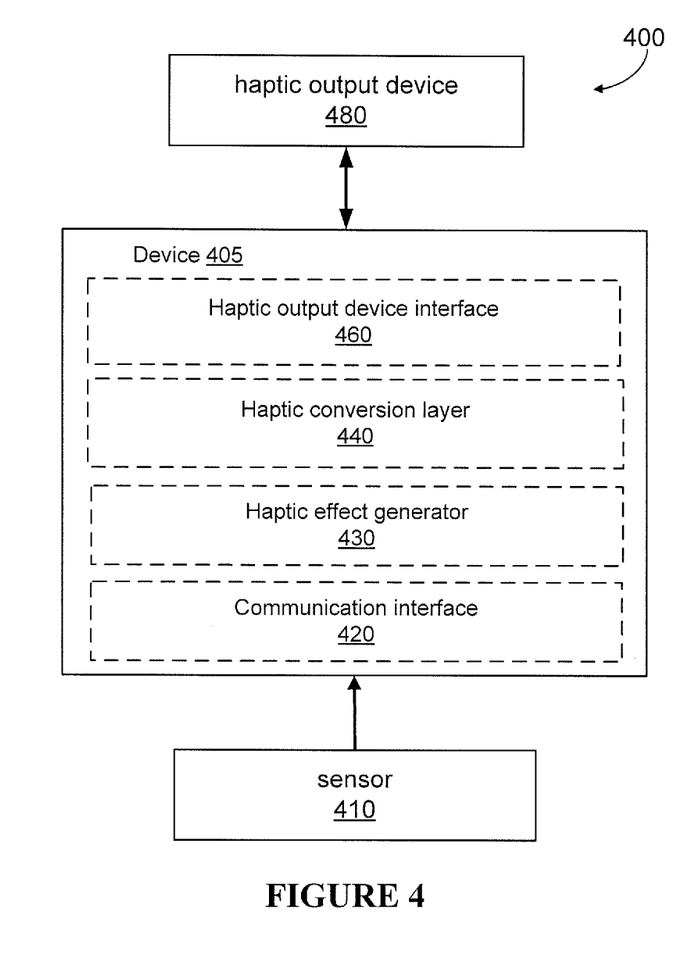
FIG. 4 is a block diagram showing the functional components of a system for implementation of one embodiment of the present disclosure.

FIG. 4 is a block diagram showing the functional components of a system for implementation of one embodiment of the present disclosure. In the embodiment shown in FIG. 4, a system 400 includes a device 405. The device 405 is in communication with a sensor 410, such as those described above in relation to FIG. 2. The sensor 410 detects user interactions and provides information regarding those interactions to the device 405 through a communication interface 420.

The communication interface 420 provides the user interactions to a haptic effect generator 430. The haptic effect generator 430 may be, for example, a game program for executing a game running on the device 405. In embodiments of the present disclosure, the haptic effect generator 430 may be designed for devices that include different haptic output device capabilities than those available with device 405. For example, if the haptic effect generator 430 is a game program, the haptic effect generator may be designed to output haptic effects to a game controller having two similarly-sized eccentric rotating mass motors designed to produce vibrations in a game controller. However, in one embodiment, the device 405 may include, for example, a single haptic output device 480. Further, in some embodiments, the single haptic output device 480 may be of a different type than that for which the game was originally designed.

The device 405 in FIG. 4 also comprises a haptic conversion layer 440. In some embodiments, the haptic conversion layer 440 may include one or more hardware and software components for converting a haptic effect from a source haptic output device to the target haptic output device 480. For example, the haptic conversion layer 440 may include one or more data stores for determining one or more characteristics of haptic output device 480. The characteristics may include, for example, the number and types of haptic output devices in communication with, contained within, or coupled to the device 405, as well as specific operating characteristics of those haptic output devices (e.g., time to accelerate, time to decelerate, maximum or minimum available power, maximum or minimum available operating frequency, etc.). The haptic conversion layer 440 can utilize the characteristics to determine how to represent the haptic effect as produced by the source haptic output device when provided by the target haptic output device 480.

The haptic conversion layer 440 may comprise an application programming interface ("API") and may be in communication with or utilize one or more existing API's to implement the method illustrated in FIG. 4. The haptic conversion layer 440 may also be implemented as a separate chip incorporated into the target device or into an interface between the target device and a peripheral. In some embodiments, the haptic conversion layer 440 includes a data store for storing user preferences. In such an embodiment, the user may be able to "tune" the effects generated on the target device by, for example, increasing or decreasing the magnitude with which effects are converted.

The signal that is generated by the haptic conversion layer 440 is then provided to the haptic output device interface 460. The haptic output device interface 460 then provides an appropriate signal to the haptic output device 460. For example, in one embodiment, the haptic conversion layer 440 provides a high-level command to the haptic output device interface 460. The haptic output device interface 460 then generates a signal that can be sent to the haptic output device 480 to cause a haptic effect to be generated. Numerous other embodiments are disclosed herein and variations are within the scope of this disclosure.

Embodiments of the present disclosure may implement a conversion layer that takes haptic commands from various different sources and maps them according to the capabilities of the current haptic device. For example, the conversion layer may provide the ability to create haptics according to the capabilities of the target device but using different sources of haptic calls, such as a dual shock controller or touch-sensitive device. For example, in one embodiment, a device according to the present disclosure may allow a user controlling a console game with a mobile device to feel the game's haptic output without the game developer changing the original dual-actuator effect code.

Illustrative Method of Haptic Conversion

Figure 5:
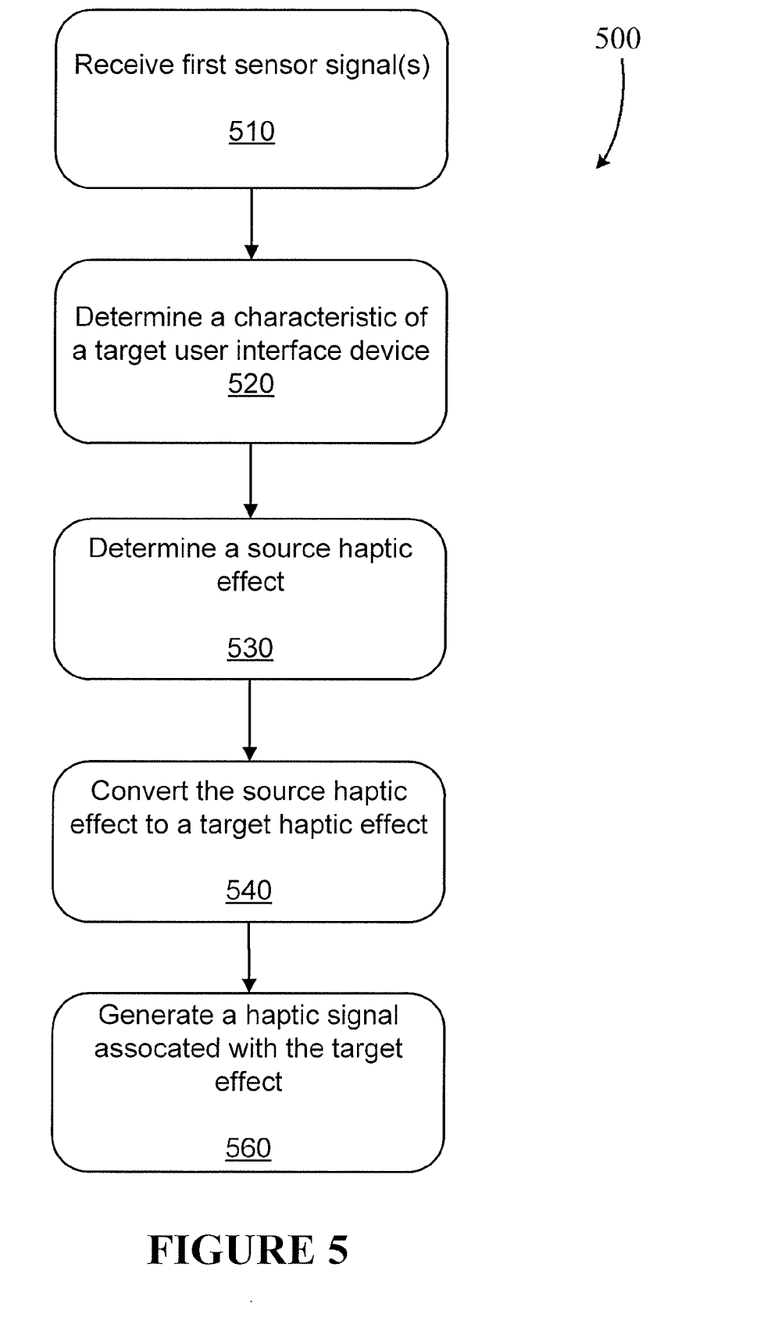
FIG. 5 is a flow chart illustrating an exemplary process for haptic conversions in one embodiments of the present disclosure.

FIG. 5 illustrates a flow chart directed to a method 500 of haptic conversion in accordance with one embodiment of the present disclosure. In some embodiments, the steps in FIG. 5 may be implemented in program code executed by a processor, for example, the processor in a general purpose computer, mobile device, or server. In some embodiments, these steps may be implemented by a group of processors. In some embodiments the steps shown in FIG. 5 may be performed in a different order. Alternatively, in some embodiments, one or more of the steps shown in FIG. 5 may be skipped, or additional steps not shown in FIG. 5 may be performed. The steps below are described with reference to components described above with regard to device 200 shown in FIG. 2.

In the embodiment shown in FIG. 5, the process 500 begins when a processor 210 receives the first sensor signal(s) 510. For example, the processor 210 may receive a sensor signal indicating that a user has interacted with a control displayed on a touch-sensitive display 230.

The processor 210 next determines a characteristic of a target user interface device 520. For example, the processor 210 may determine that the target user interface device includes a single haptic output device 240. The processor may further determine the type of haptic output device 240. For example, the processor may determine that the haptic output device 240 is a vibrating motor. In other embodiments, during initialization, or at some other point, the processor 210 performs testing to determine what types of haptic effects the target haptic output device 240 is capable of performing.

Various characteristics may be utilized to convert the haptic effects. For example, an embodiment may take into account the rise time, fall time and maximum force a particular motor can deliver in a target interface device. Another embodiment may take into account the type of feedback that can be output by a target interface device, such as a vibration or deformation. In some embodiments, the processor 210 may be configured to access a data store, e.g., memory 210 comprising a map of the duration, magnitude and envelope of the source and target motors. In some embodiments, the processor 210 may also convert the haptic effect from an effect configured to operate with a dual actuator source to a haptic effect configured to operate with a single actuator target. For instance, in one embodiment, the duration and magnitude being sent to two actuators may be averaged and then sent to the single actuator in order to provide an effect. In some embodiments, one or more of the target actuators may be the same or similar to one or more of the source actuators. In such a case, the mapping between any two actuators may be a simple, direct mapping.

In one embodiment, the target actuator may have a greater haptic capability than the source actuator. In such an embodiment, an augmented mapping could occur. For example, an embodiment in which a dual ERM (DualShock)

is mapped to one piezo actuator could use pulsing vibration mapping parameters to simulate both the large and small ERM motors (or average that feeling if both are playing in the source effect), but additional audible range frequency mapping could be applied for the piezo mapping that is not possible with the slower ERM actuators. In another embodiment in which a DualShock is mapped to a kinesthetic feedback device, such as a rumblepad or racing wheel, the source haptic effect could have additional directional haptic mapping applied to the target actuation. In yet another example, an embodiment in which a DualShock is mapped to a single actuator that is capable of providing both vibrational and temperature based haptics, would allow for an augmented haptic mapping having vibration as well as temperature parameters, e.g., warmer for large motor mappings and cooler for smaller motor mappings.

In yet another example, a source vibration command is modified for a target deformation actuator. For instance, a high frequency vibration may be converted to a small motion haptic effect. And a low frequency vibration is converted to a large motion effect. In some embodiments, a design tool is used to determine effects on a source platform, such as a PC, and map those effects to a target platform, such as Android.

In the embodiments described herein, a designer of a user interface is able to design haptic effects for a program for use on a particular device. Subsequently, if the user interface is executed on a different device platform than the one for which the effects were designed, then the effects are automatically converted to the new platform without the need for the designer to take additional steps to enable the appropriate effects on the new platform. For instance, a game designer is able to design a game for play on a gamepad for a PC, and upon execution of the same game on a mobile phone, the haptic effects are automatically converted so that the effects on the mobile phone correspond to the effects that the designer originally specified.

The processor 210 next determines a source haptic effect 530. In some embodiments, the source haptic effect may comprise a haptic effect generated by an application prior to conversion. For example, the designer of a game may associate a certain haptic effect with a particular occurrence in a game. For instance, if an explosion occurs, the game may be designed to output a high-magnitude, relatively long duration vibration through both eccentric rotating mass motors in a game controller. In some embodiments, however, application developer may have designed the haptic effect to be output using specific types of haptic output devices. In some embodiments, the user interface device 200 may not comprise these types of haptic output devices.

The processor 210 next converts the source haptic effect to a target haptic effect 540. In some embodiments, the conversion is based on the one or more characteristics of the target user interface device 200 determined at 520. The conversion will attempt a conversion that represents the source haptic effect on the target user interface device given the characteristic(s) of the target user interface device 200. In some embodiments, this conversion may be configured to compensate for factors such as the number of haptic output devices, the type of haptic output devices, the available bandwidth of haptic output devices, the available power of the haptic output devices, and factors associated with the source haptic effect.

In embodiments of the present disclosure, a processor 210 maps source effects for a source device having M source actuators to destination effects for a destination or target device having N destination actuators. In one embodiment, if each source effect address only one source actuator and each destination effect address only one destination actuator, the processor 210 may perform the following steps: for each source effect, map the source effect to a destination effect addressing the destination actuator that can reproduce the source effect given source actuator performance characteristics and destination actuator performance characteristics over the dynamic range of the source effect. For instance, if a source effect is a low-frequency effect, and the target includes a destination actuator that is capable of outputting the same or similar effect as the source actuator, the processor maps the source effect to a destination effect on that particular target actuator. In another embodiment of mapping from M to N actuators, directional spatial information may be preserved. For example, if a right to left directional haptic effect is used as a source haptic effect, the same right to left directional effect may be preserved for the target effect even though the target device may have less or more actuators.

The processor 210 then generates a haptic signal associated with the target effect 560. This signal can then be output to one or more haptic output devices 240 to allow the user to experience the effect. While the target device is described as having a single haptic output device 240, multiple haptic output devices may be present. And the haptic signal that is generated may be generated for one, some, or all of the haptic output devices present on the target user interface device 200.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
    determining, by a target user interface device, a characteristic of a target haptic output device in the target user interface device;
    determining, by the target user interface device, a source haptic effect configured to be output by a source haptic output device in a source user interface device, wherein the source haptic output device is a different type of haptic output device than the target haptic output device;
    converting, by the target user interface device, the source haptic effect to a target haptic effect configured for the target haptic output device based at least in part on the characteristic of the target haptic output device;
    generating, by the target user interface device, a haptic signal configured to cause the target haptic output device to output the target haptic effect; and
    outputting, by the target user interface device, the haptic signal to the target haptic output device.

2. The method of claim 1,
    wherein determining the characteristic of the target haptic output device comprises identifying the target haptic output device, and
    wherein the target user interface device comprises a target mobile device.

3. The method of claim 1, wherein determining the characteristic of the target haptic output device comprises detecting a two-motor vibration.

4. The method of claim 1,
    wherein the target haptic output device comprises a single motor, and
    wherein converting the source haptic effect to the target haptic effect comprises interpreting a representation of a two-motor vibration corresponding to the source haptic output device as a single motor vibration that can be output by the single motor in the target user interface device.

5. The method of claim 1, wherein determining the characteristic of the target haptic output device comprises determining a haptic output device type of the target haptic output device.

6. The method of claim 1, wherein the source user interface device comprises a game console controller.

7. The method of claim 1, wherein the target user interface device comprises a mobile phone.

8. The method of claim 1, wherein the target user interface device is a different type of device than the source user interface device.

9. The method of claim 8, wherein the source user interface device is a game console controller and the target user interface device is a smartphone.

10. The method of claim 1, wherein the source haptic output device comprises two motors and the target haptic output device comprises a single eccentric rotating mass.

11. The method of claim 1, wherein the source haptic output device comprises a linear resonant actuator and the target haptic output device comprises a piezoelectric actuator.

12. The method of claim 1, wherein the characteristic of the target haptic output device comprises at least one of a rise time or a fall time of the target haptic output device.

13. The method of claim 1, wherein the characteristic of the target haptic output device comprises a maximum force of the target haptic output device.

14. A system comprising:
a target user interface device comprising a target haptic output device and a processor in communication with the target haptic output device, wherein the processor is configured to:
determine a characteristic of the target haptic output device;
determine a source haptic effect configured to be output by a source haptic output device in a source user interface device, wherein the source haptic output device is a different type of haptic output device than the target haptic output device;
convert the source haptic effect to a target haptic effect configured for the target haptic output device based at least in part on the characteristic of the target haptic output device;
generate a haptic signal configured to cause the target haptic output device to output the target haptic effect; and
output the haptic signal to the target haptic output device.

15. The system of claim 14, wherein determining the characteristic of the target haptic output device comprises identifying the target haptic output device in the target user interface device, wherein the target user interface device comprises a mobile device.

16. The system of claim 14, wherein determining the characteristic of the target haptic output device comprises detecting a two-motor vibration.

17. The system of claim 14,
wherein the target haptic output device comprises a single motor configured to output a vibration, and
wherein converting the source haptic effect to the target haptic effect comprises interpreting a representation of a two-motor vibration corresponding to the source haptic output device as a single motor vibration that can be output by the single motor in the target user interface device.

18. The system of claim 14, wherein determining the characteristic of the target haptic output device comprises determining a haptic output device type of the target haptic output device.

19. The system of claim 14, wherein the source user interface device comprises a game console controller.

20. The system of claim 14, wherein the target user interface device comprises a mobile phone.

21. A non-transitory computer readable medium comprising one or more software applications configured to be executed by a processor in a target user interface device, the one or more software applications configured to:
determine a characteristic of a target haptic output device in the target user interface device;
determine a source haptic effect configured to be output by a source haptic output device in a source user interface device, wherein the source haptic output device is a different type of haptic output device than the target haptic output device;
convert the source haptic effect to a target haptic effect configured for the target haptic output device based at least in part on the characteristic of the target haptic output device;
generate a haptic signal configured to cause the target haptic output device to output the target haptic effect; and
output the haptic signal to the target haptic output device.

22. The non-transitory computer readable medium of claim 21, wherein determining the characteristic of the target haptic output device comprises identifying the haptic output device in a target mobile device.

23. The non-transitory computer readable medium of claim 21, wherein determining the characteristic of the target haptic output device comprises detecting a two-motor vibration.

24. The non-transitory computer readable medium of claim 21,
wherein the target haptic output device comprises a single motor, and
wherein converting the source haptic effect to the target haptic effect comprises interpreting a representation of a two-motor vibration corresponding to the source haptic output device as a single motor vibration that can be output by the single motor in the target user interface device.

25. The non-transitory computer readable medium of claim 21, wherein determining the characteristic of the target haptic output device comprises determining a haptic output device type.

* * * * *